US009308701B2

(12) United States Patent  
Badolato et al.

(10) Patent No.: US 9,308,701 B2  
(45) Date of Patent: Apr. 12, 2016

(54) PROCESS AND APPARATUS FOR MANUFACTURING TYRES FOR VEHICLE WHEEL

(75) Inventors: Luigi Antonio Badolato, Milan (IT); Pietro Dale', Milan (IT); Gianni Portinari, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 0 days.

(21) Appl. No.: 13/505,446

(22) PCT Filed: Oct. 29, 2010

(86) PCT No.: PCT/IB2010/002783  
§ 371 (c)(1),  
(2), (4) Date: May 1, 2012

(87) PCT Pub. No.: WO2011/051798  
PCT Pub. Date: May 5, 2011

(65) Prior Publication Data  
US 2012/0216942 A1 Aug. 30, 2012

Related U.S. Application Data

(60) Provisional application No. 61/272,815, filed on Nov. 6, 2009.

(30) Foreign Application Priority Data

Nov. 2, 2009 (IT) .............................. MI2009A1906

(51) Int. Cl.  
*B29D 30/08* (2006.01)  
*B29D 30/16* (2006.01)  
(Continued)

(52) U.S. Cl.  
CPC ........ *B29D 30/1628* (2013.01); *B29D 30/3028* (2013.01); *B29D 2030/2678* (2013.01)

(58) Field of Classification Search  
CPC ........... B29D 30/1621; B29D 30/1628; B29D 30/3021; B29D 30/3028; B29D 30/28; B29D 30/70; B29D 2030/2678; B29D 2030/4481  
USPC ................... 156/117, 130, 397, 405.1, 406.4; 152/531  
See application file for complete search history.

(56) References Cited

U.S. PATENT DOCUMENTS 4,812,196 A 3/1989 Ishii  
4,844,768 A * 7/1989 Kimura ......................... 156/361  
(Continued)

FOREIGN PATENT DOCUMENTS

CN 101172400 5/2008  
EP 0 561 609 A1 9/1993  
(Continued)

OTHER PUBLICATIONS

Derwent abstract for JP-01058536-A, patent publication published Mar. 6, 1989.*

(Continued)

*Primary Examiner* — Geoffrey L Knable  
(74) *Attorney, Agent, or Firm* — Finnegan, Henderson, Farabow, Garrett & Dunner, L.L.P.

(57) ABSTRACT

A process and apparatus for manufacturing tires for vehicle wheels includes the step of building, on a forming support, a belt structure including at least one reinforcing structure of the so-called zero-degree type. The reinforcing structure is formed by depositing a continuous elongated reinforcing element on a deposition surface arranged in a radially outer position with respect to the forming support. The aforementioned deposition includes the step of exerting, through at least one element made from magnetic material, a magnetic attraction on a portion of the continuous elongated reinforcing element arranged at at least one pressing member and moving said at least one pressing member toward the forming support until the continuous elongated reinforcing element is brought into contact with the deposition surface.

9 Claims, 6 Drawing Sheets

(51) Int. Cl.
    *B29D 30/30*     (2006.01)
    *B29D 30/26*     (2006.01)

(56) References Cited

U.S. PATENT DOCUMENTS

| | | | | |
|---|---|---|---|---|
| 4,877,477 | A | * | 10/1989 | Yabe et al. ................. 156/406.4 |
| 4,983,243 | A | | 1/1991 | Nakano et al. |
| 4,989,658 | A | | 2/1991 | Maathuis et al. |
| 5,335,415 | A | | 8/1994 | Okufuji |
| 2003/0024627 | A1 | | 2/2003 | Ohkubo |
| 2005/0194076 | A1 | | 9/2005 | Vermaat et al. |
| 2009/0250156 | A1 | * | 10/2009 | Bigogno et al. .............. 156/123 |
| 2010/0000660 | A1 | | 1/2010 | Iwasaki |

FOREIGN PATENT DOCUMENTS

| | | | |
|---|---|---|---|
| EP | 0 712 739 | A1 | 5/1996 |
| EP | 1 279 485 | A2 | 1/2003 |
| EP | 1 574 362 | A1 | 9/2005 |
| EP | 2 127 857 | A1 | 12/2009 |
| GB | 1487426 | A * | 9/1977 |
| JP | 64-058536 | A * | 3/1989 |
| JP | 2001009928 | A * | 1/2001 |
| RU | 2184036 | C1 | 6/2002 |
| SU | 1725516 | A1 | 7/1994 |
| WO | WO 2007/054984 | A1 | 5/2007 |
| WO | WO 2007054984 | | 5/2007 |
| WO | WO 2008/111402 | A1 | 9/2008 |

OTHER PUBLICATIONS

International Search Report from the European Patent Office for International Application No. PCT/IB2010/002783, mailing date Apr. 6, 2011.
Chinese Office Action in CN 201080049355, dated Mar. 3, 2014.
Russian Decision on Grant issued May 5, 2015, in Russian Patent Application No. 2012122801/05(034649).
Russian Office Action issued Sep. 8, 2014 re Russian Application No. 2012122801/05(034649).

* cited by examiner

PROCESS AND APPARATUS FOR MANUFACTURING TYRES FOR VEHICLE WHEEL

CROSS REFERENCE TO RELATED APPLICATIONS

This application is a national phase application based on PCT/IB2010/002783, filed Oct. 29, 2010, which claims the priority of Italian Patent Application No. MI2009A001906, filed Nov. 2, 2009, and the benefit of U.S. Provisional Application No. 61/272,815, filed Nov. 6, 2009, the content of all of which is incorporated herein by reference.

BACKGROUND OF THE INVENTION

1. Field of the Invention

The present invention relates to a process and an apparatus for manufacturing tyres for vehicle wheels.

2. Description of the Related Art

A tyre generally comprises a carcass structure comprising at least one carcass ply formed of reinforcement cords incorporated in an elastomeric matrix. The carcass ply has end edges respectively engaged with annular anchoring structures. The latter are arranged in the areas of the tyre usually identified by the name "beads" and they are normally formed each by a substantially circumferential annular insert on which at least one filling insert is applied, in a radially outer position thereof. Such annular inserts are commonly identified as "bead cores" and have the task of keeping the tyre firmly fixed to the anchoring seat specifically provided in the rim of the wheel, thus preventing, in operation, the radially inner end edge of the tyre coming out from such a seat.

At the beads specific reinforcement structures may be provided having the function of improving the torque transmission to the tyre.

The carcass structure is formed on a forming support preferably having a substantially cylindrical shape.

In a radially inner position with respect to the carcass ply(plies) a coating layer made from elastomeric material, typically known as "liner", is typically provided.

In a radially outer position with respect to the carcass structure, on the other hand, a belt structure is associated.

The belt structure is generally made on a different forming support from the one on which the carcass structure is formed.

The belt structure comprises one or more belt layers arranged radially one on top on the other and having textile or metallic reinforcement cords arranged preferably according to an inclined orientation with respect to the circumferential direction of the tyre and normally crossed with respect to the cords of the possible adjacent belt layer.

The belt structure can also comprise at least one reinforcing structure defined by at least one continuous elongated reinforcing element including at least one textile or metallic reinforcement cord incorporated in a matrix of elastomeric material and extending parallel to the longitudinal direction of the elongated element itself.

The continuous elongated reinforcing element is wound on the forming support—typically on a radially outer surface of at least one belt layer deposited on the forming support— according to axially adjacent circumferential coils to form the so-called "zero degree layer". Such a term is used to define a layer wherein the reinforcing cords have an orientation substantially coinciding with a circumferential direction of the tyre.

According to the needs, and in particular in tyres for heavy vehicles, one or more zero degree layers can be provided, each of which extending along the entire width of the belt structure or along a portion of the axial extension thereof (in this last case, normally, at the axially outer end portions of the underlying belt layer).

Between the carcass structure and the belt structure a layer of elastomeric material, known as "under-belt", can be provided, said layer having the function of making the radially outer surface of the carcass structure as uniform as possible for the subsequent application of the belt structure.

In a radially outer position with respect to the belt structure a tread band is applied, also made from elastomeric material, as well as other structural elements making up the tyre.

On the side surfaces of the carcass structure respective sidewalls of elastomeric material are also applied, each extending from one of the side edges of the tread band up to the respective annular anchoring structure to the beads.

Throughout the present description and in the subsequent claims, the terms "radial" and "axial" and the expressions "radially inner/outer" and "axially inner/outer" are used with reference to the radial direction and to the axial (or longitudinal) direction of a tyre (or of the forming support used to manufacture a specific component of the tyre). The terms "circumferential" and "circumferentially", on the other hand, are used with reference to the annular extension of the tyre/forming support.

Throughout the present description, unless specified otherwise, and in the subsequent claims, "continuous elongated reinforcing element" is used to indicate an element comprising at least one steel reinforcing cord incorporated in a matrix of elastomeric material and extending parallel to a longitudinal direction of said continuous elongated reinforcing element.

Throughout the present description and in the subsequent claims, the definitions "upstream" and "downstream", unless indicated otherwise, refer to the feeding direction of the continuous elongated reinforcing element towards a forming support.

Moreover, when throughout the present description and in the subsequent claims reference is made to the feeding direction of the continuous elongated reinforcing element, it is specifically referred, unless indicated otherwise, to a theoretical line at the lower surface of the continuous elongated reinforcing element during its movement towards the forming support.

WO 2007/054984 to the same Applicant describes an apparatus and a process for the manufacturing of zero degree reinforcement structures by deposition, on a substantially cylindrical forming support, of a continuous elongated reinforcing element comprising textile or metallic cords. The apparatus comprises a base with which an arm is associated that can oscillate, when driven by a suitable fluid-dynamic actuator, between a rest position in which the arm is in a distal position from the forming support and an operative position in which the arm is in a proximal position to the forming support so as to allow the deposition of the aforementioned continuous elongated reinforcing element.

Such a continuous elongated reinforcing element is unwound from a collection reel and, through suitable deviating pulleys, fed through the aforementioned arm towards the forming support. Such an arm comprises, in particular, a deviating pulley in an inlet portion thereof and an end block in an outlet portion thereof. The end block acts as a guide channel of said continuous elongated reinforcing element towards the forming support.

At least one pressing roller is hinged to the end block; when a second fluid-dynamic actuator is actuated, at least one pressing roller can be moved between a rest position in which it is away from the forming support and a work position in which it operates in thrusting relationship on said continuous elongated reinforcing element so as to deposit it onto the forming support.

The oscillating arm also carries at least one shearing unit which can be selectively activated at the end of the deposition step described above to cut said continuous elongated reinforcing element in a portion located between the end block and the inlet pulley, and an advancing device for bringing the top free end of said continuous elongated reinforcing element in a canti-levered position with respect to the end block and at the pressing roller, so as to be able to start with a new deposition cycle.

SUMMARY OF THE INVENTION

The Applicant observed that, in an apparatus of the type described above, during the feeding of a continuous elongated reinforcing element according to the previous definition, problems occur that lead to an incorrect positioning thereof on a forming support.

In particular, the Applicant verified that, at each deposition cycle, there is an incorrect positioning of the top and bottom portions of the continuous elongated reinforcing element, such incorrect positioning typically consisting of a misalignment of the aforementioned portions with respect to the transversal middle plane of the forming support and thus of an orientation different to zero degrees. In this case the operator is required to make, at each deposition cycle, a corrective intervention by manually removing the top and bottom portions of the piece of continuous elongated reinforcing element deposited on the forming support to then re-apply them, again manually, in the desired position.

The Applicant verified that the manual intervention of the operator, as well as taking up a lot of time, is very often difficult, if not actually impossible, in those cases in which the top portion of the piece of continuous elongated reinforcing element deposited is located at least partially below the axially adjacent coil(s). All this has inevitable negative influences as far as the cost-effectiveness of the process is concerned and, in cases in which the intervention of the operator is unable to correct the problem, the belt structure being processed could be discarded.

The Applicant believes that the incorrect positioning of the top and bottom portions of the continuous elongated reinforcing element is due essentially to twisting and/or lateral deviations that occur on the continuous elongated reinforcing element because of the release of the residual internal tensions at the top portion thereof once it projects canti-levered from the end block and at the bottom portion thereof once it leaves the end block. The aforementioned tensions are probably due mainly to the metallic material forming the cords.

The Applicant has realised that in order to correctly position the top and bottom portions of the continuous elongated reinforcing element on the forming support it is necessary to suitably counteract the twisting and/or deviating stress acting on the portion of continuous elongated reinforcing element under deposition.

The Applicant has perceived that such a counteraction can be effectively provided by exerting a suitable magnetic attraction at least on the top and bottom portions of the continuous elongated reinforcing element through a suitable element.

The Applicant has thus found that, by positioning at least one pressing member at the forming support and, at said at least one pressing member, at least one element adapted to generate a magnetic force, it is advantageously possible to "freeze" the position of the continuous elongated reinforcing element projecting canti-levered from the deposition apparatus, in this way allowing also the top and bottom portions of the continuous elongated reinforcing element to keep the desired position with respect to the forming support. It is thus possible to achieve in a totally automatic way the optimal positioning of the continuous elongated reinforcing element on the forming support, to the benefit of the cost-effectiveness of the process and of the quality of the tyre being obtained.

The present invention thus relates, in a first aspect thereof, to a process for manufacturing tyres for vehicle wheels, each tyre comprising a belt structure arranged between a carcass structure and a tread band, wherein the belt structure comprises at least one zero-degree reinforcing structure, said process comprising:

building said zero-degree reinforcing structure by depositing at least one continuous elongated reinforcing element on a deposition surface arranged in a radially outer position with respect to a forming support, the aforementioned deposition comprising:

exerting a magnetic attraction on a portion of continuous elongated reinforcing element arranged at at least one deposition pressing member;

moving said at least one pressing member towards the forming support until the continuous elongated reinforcing element is brought into contact with said deposition surface.

In accordance with the present invention, a magnetic action is advantageously exerted on the portion of continuous elongated reinforcing element under deposition. Such a magnetic action ensures that such a portion of continuous elongated reinforcing element is kept in the desired feeding position with respect to the forming support. Possible twisting or lateral deviations of the continuous elongated reinforcing element that would lead to an inaccurate positioning of such an elongated element on the forming support are thus suitably counteracted.

In a second aspect thereof, the present invention relates to an apparatus for manufacturing a tyre for vehicle wheels, each tyre comprising a belt structure arranged between a carcass structure and a tread band, wherein the belt structure comprises at least one zero-degree reinforcing structure, said apparatus comprising:

at least one forming support for building said zero-degree reinforcing structure by depositing at least one continuous elongated reinforcing element on a deposition surface arranged in a radially outer position with respect to said forming support;

at least one deposition member of the continuous elongated reinforcing element on said deposition surface; wherein said at least one deposition member comprises:

at least one pressing member movable between a rest position in which the pressing member is in a moved-away position from the forming support and an operative position in which the pressing member is in a moved-close position to the forming support;

at least one element adapted to exert a magnetic force arranged at said at least one pressing member.

Advantageously, such an apparatus allows the process described above to be carried out, thus allowing the aforementioned advantageous results to be achieved.

The present invention, in at least one of the aforementioned aspects, can have at least one of the following preferred characteristics, taken individually or in combination with each other.

Preferably said magnetic attraction is generated through at least one element made from magnetic material arranged at said at least one pressing member.

Preferably said pressing member is moveable around a pivoting axis.

Preferably, the continuous elongated reinforcing element is guided towards the forming support along a guide channel. Advantageously, the guide channel properly directs the continuous elongated reinforcing element towards the forming support, preventing it from deviating from the preset path because of the releasing of residual internal tension or for other reasons.

Even more advantageously, thanks to the provision of the element made from magnetic material downstream of the aforementioned guide channel, it is possible to substantially limit the longitudinal extension of such a channel, thus reducing the extent of possible undesired friction or stretching on the continuous elongated reinforcing element and at the same time ensuring that the desired feeding position with reference to the forming support is maintained.

Preferably, the continuous elongated reinforcing element is sheared through a suitable cutting member. More preferably, the shearing takes place upstream of the guide channel. In this way the entire piece of continuous elongated reinforcing element that will be deposited on the forming support is properly guided towards the forming support.

Preferably, after the shearing of the continuous elongated reinforcing element, the deposition of said continuous elongated reinforcing element on the deposition surface is completed.

Preferably, the portion of continuous elongated reinforcing element under deposition projects canti-levered from the guide channel. The continuous elongated reinforcing element thus remains guided until just before being deposited on the forming support.

The movement of the pressing member towards the forming support is preferably carried out at the beginning of the deposition of the continuous elongated reinforcing element. More preferably, such movement is carried out at the beginning and at the end of the deposition of the continuous elongated reinforcing element.

In preferred embodiments of the present invention, the deposition of the continuous elongated reinforcing element comprises:
  moving said at least one pressing member away from the forming support;
  depositing the continuous elongated reinforcing element on the forming support keeping said at least one pressing member in such a moved-away position until the shearing of the continuous elongated reinforcing element is carried out;
  after the shearing, moving said at least one pressing member towards the forming support until the continuous elongated reinforcing element is brought into contact with said deposition surface.

Advantageously, the Applicant has found that by holding the pressing member in the moved-away position from the forming support for the entire intermediate step of the deposition cycle the tension exerted on the continuous elongated reinforcing element under deposition is reduced, with clear advantageous effects in terms of stability and uniformity of deposition.

Preferably, when said at least one pressing member is moved towards the forming support said continuous elongated reinforcing element is fed along a direction which is not tangent to the deposition surface. Advantageously, such a provision makes it possible to bring the extreme end of the guide channel as close as possible to the forming support without interfering with the deposition surface, thus reducing as much as possible the portion where the continuous elongated reinforcing element is no longer guided, i.e. projects canti-levered. Consequently, the portion of continuous elongated reinforcing element wherein the undesired phenomenon of the release of internal tensions can occur is reduced.

Preferably, when said at least one pressing member is moved away from the forming support said continuous elongated reinforcing element is fed along a direction substantially tangent to the deposition surface. The Applicant has found that in this way the continuous elongated reinforcing element is placed on the forming support without the aforementioned elongated element being subject to undesired stretching or stresses.

In preferred embodiments of the present invention, the continuous elongated reinforcing element runs without sliding in the guide channel. In this way undesired friction or stretching on the continuous elongated reinforcing element are avoided.

Preferably, said at least one pressing member comprises at least one pressing roller and the continuous elongated reinforcing element runs along a direction substantially tangent to at least one inlet roller arranged upstream of said guide channel and to said at least one pressing roller. Such a provision allows the continuous elongated reinforcing element to run without friction in the guide channel.

According to a preferred embodiment of the present invention, it is possible to adjust the pressure for driving the movement of said at least one pressing member towards the forming support. This advantageously makes it possible to adapt the deposition pressure of the continuous elongated reinforcing element on the forming support to the specific deposition conditions.

Preferably, said element adapted to exert a magnetic force is an element made from magnetic material.

Preferably, a guide channel of the continuous elongated reinforcing element towards the forming support is provided.

In a preferred embodiment of the present invention at least one cutting member of the continuous elongated reinforcing element is provided.

In preferred embodiments of the present invention, said at least one pressing member comprises at least one pressing roller and said at least one element made from magnetic material is defined by a coating of magnetic material applied to a radially outer surface of said at least one pressing roller.

In alternative embodiments of the present invention, said at least one element made from magnetic material comprises at least one magnet arranged inside or alongside said at least one pressing member.

Preferably, said at least one magnet does not rotate integrally with said at least one pressing member.

In preferred embodiments of the present invention, the guide channel has a closed cross section. Advantageously, such a channel allows the continuous elongated reinforcing element to be guided when it is not perfectly straight or when it tends to twist upon itself due to the release of internal tensions or for other reasons.

Preferably, the guide channel has a height greater than the continuous elongated reinforcing element. In this way accidental contacts of the continuous elongated reinforcing element with the upper wall of the guide channel are limited, consequently limiting the risk of generating undesired friction or stretching on the continuous elongated reinforcing element running in the guide channel.

In particularly preferred embodiments of the present invention, the guide channel has a width greater than the width of the continuous elongated reinforcing element. In this way accidental contacts of the continuous elongated reinforcing element with the side walls of the guide channel are limited, consequently limiting, in this case, the risk of generating undesired friction or stretching on the continuous elongated reinforcing element that runs in the guide channel.

Preferably, the guide channel comprises an upstream portion with progressively decreasing cross sections along a feeding direction of the continuous elongated reinforcing element and a downstream portion with a substantially constant cross section. The Applicant has found that by such geometry the continuous elongated reinforcing element is prevented from accidentally jamming in the guide channel while it runs therein.

More preferably, the upstream portion is longer than the downstream portion. Even more preferably, the upstream portion is at least 2 times longer than the downstream portion.

Preferably, said guide channel and said at least one pressing member are associated with an arm moveable around said pivoting axis between said rest position and said operative position.

Preferably, when said arm is in said operative position the guide channel extends along a direction which is not tangent to the deposition surface. In this way the extreme end of the guide channel can be brought as close as possible to the forming support without interfering with the deposition surface.

More preferably, when said arm is in the rest position the guide channel extends along a direction substantially tangent to the deposition surface. In this way the continuous elongated reinforcing element can be deposited on the forming support without causing undesired stretching or stresses.

Preferably, said at least one pressing member comprises at least one pressing roller and said arm comprises at least one inlet roller of the continuous elongated reinforcing element arranged upstream of the guide channel, said at least one inlet roller being arranged so as to define a feeding direction substantially tangent to said at least one pressing roller. In this way the continuous elongated reinforcing element is prevented from making contact with the lower wall of the guide channel, making the continuous elongated reinforcing element run without friction in the guide channel.

BRIEF DESCRIPTION OF THE DRAWINGS

Further characteristics and advantages of the present invention will become clearer from the following detailed description of some preferred embodiments of an apparatus and of a process in accordance with the present invention, made with reference to the attached drawings. In such drawings.

DETAILED DESCRIPTION OF THE INVENTION

Figure 1:
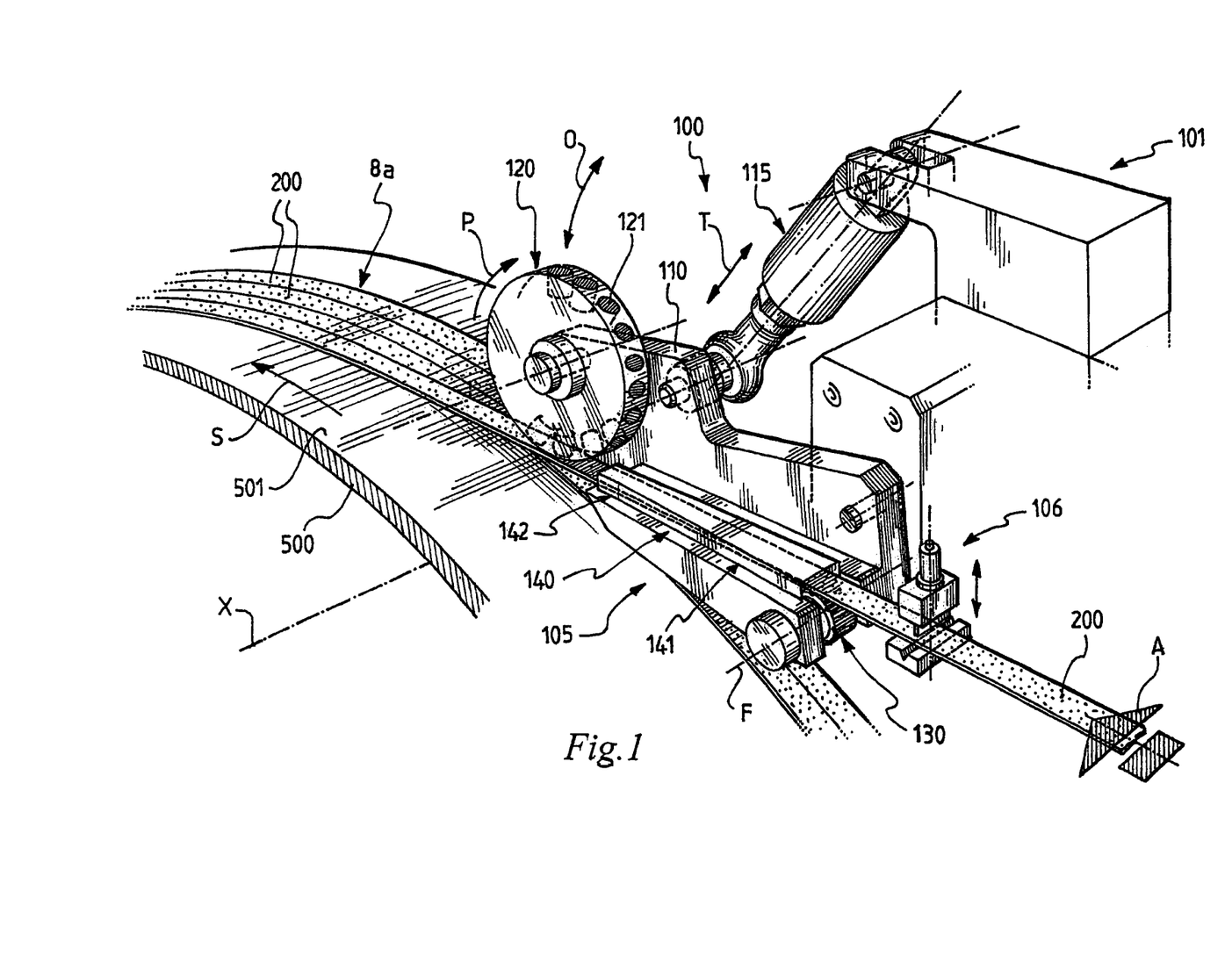
FIG. 1 is a schematic perspective view of a portion of an apparatus in accordance with the present invention, such an apparatus being shown in a configuration corresponding to an intermediate operative step of the process of the present invention.

In FIG. 1, reference numeral 100 wholly indicates an example embodiment of an apparatus for depositing a continuous elongated reinforcing element on a forming support. Such an apparatus 100 is used, in particular, in a process for manufacturing tyres for vehicle wheels. More specifically, the apparatus 100 allows a reinforcing structure of the so-called zero degree type to be made in the building process of the belt structure of tyres for vehicle wheels.

Figure 8:
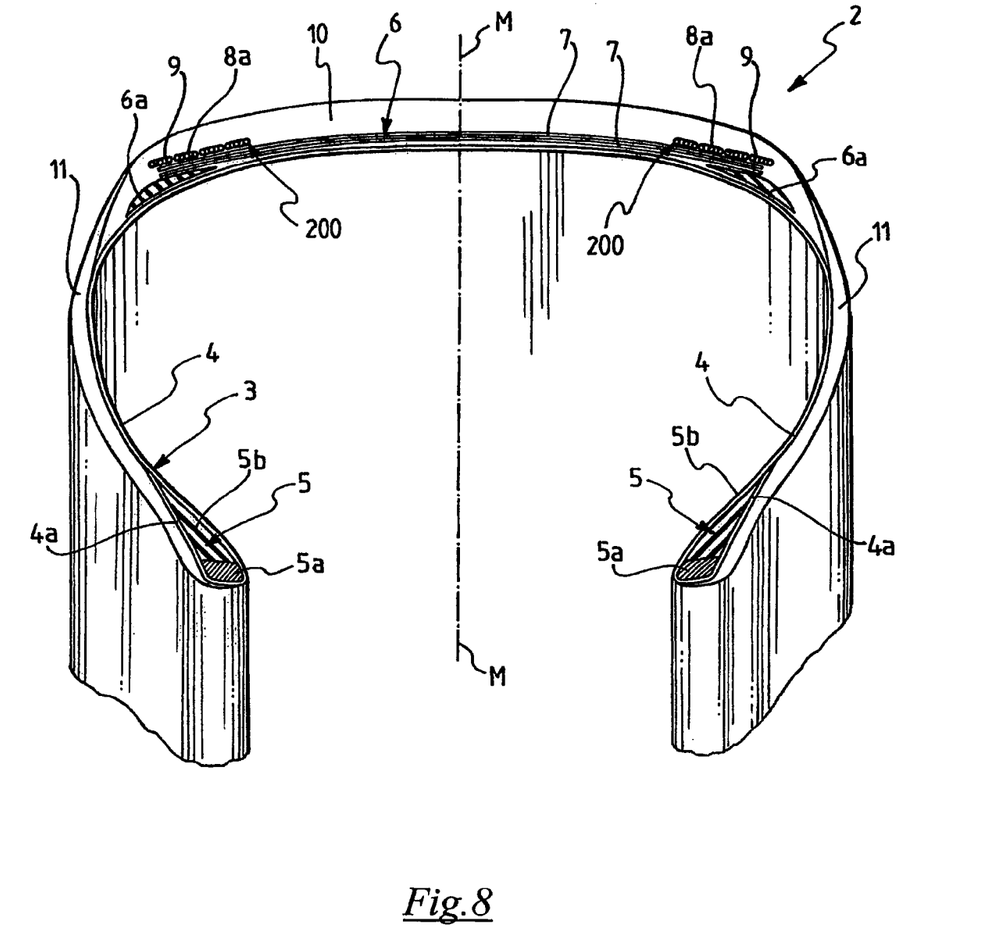
FIG. 8 is a section view of a tyre obtainable in accordance with the present invention.

As schematically indicated in FIG. 8, a tyre 2 obtainable by the apparatus and the process of the present invention essentially comprises a carcass structure 3 having one or more carcass plies 4 each formed by reinforcement cords incorporated in an elastomeric matrix.

Each carcass ply 4 comprises respective axially opposite end edges 4a, engaged with respective annular anchoring structures 5 arranged at the circumferentially inner edges of the tyre, i.e. in the areas of the tyre usually identified by the name "beads".

Each annular anchoring structure 5 is formed by a substantially circumferential annular insert 5a (commonly identified as "bead core") on which at least one filling insert 5b is applied, in a radially outer position thereof.

The carcass plies 4 can be internally coated with a so-called "liner" (not illustrated), essentially formed by an elastomeric layer that is impermeable to air or other fluid used for inflating the tyre 2.

In a radially outer position with respect to the carcass structure 3 a belt structure 6 is applied, comprising one or more belt layers 7 reinforced through textile or metallic cords arranged according to an orientation properly inclined with respect to the circumferential extension of the tyre 2 and preferably crossed with respect to the orientation of the cords belonging to the adjacent layer or layers.

The belt structure 6 also comprises at least one reinforcing structure, of the type usually called "zero degree layer", applied in a radially outer position with respect to the aforementioned belt layers 7.

The zero degree layer is normally made up of at least one continuous elongated element 200 wound according to axially adjacent coils, in a moved-close relationship or suitably spaced apart from one another, along to the axial extension of the tyre 2.

In the depicted example, the zero degree layer consists of two distinct portions 8a extending towards the equatorial plane M of the tyre from respective axially opposite edges of the underlying belt layers 7.

Between the carcass structure 3 and the belt structure 6 a layer of elastomeric material (not illustrated), called "under-belt" layer, can be provided, said layer having the function of making the radially outer surface of the carcass structure 3 as uniform as possible for the subsequent application of the belt structure 6. Sub-belt inserts 6a can also be applied between the carcass structure 3 and the belt structure 6 at the respective axially opposite end edges.

A tread band 10 made from elastomeric material extends circumferentially in a radially outer position with respect to the belt structure 6. Between each axially outer edge of the tread band 10 and a respective bead extends a sidewall 11 to cover the respective side portion of the carcass structure 3.

The apparatus 100 of the present invention is suitable for making the zero degree layer of the tyre 2 described above, or for making analogous reinforcement structures.

With reference to FIG. 1, the apparatus 100 comprises a forming support 500, generally cylindrical or toroidal, pivotally mounted around a rotation axis X-X. A deposition surface 501 is defined on the forming support 500. Typically, such a deposition surface 501 corresponds to the radially outer surface of a belt layer 7 of the belt structure 6 of the tyre 2.

At the forming support 500 there is a base 101, of the conventional type, to which an arm 105 is connected, at a pivoting axis F. Through such an arm 105 a continuous elongated reinforcing element 200 is fed towards the forming support 500 to then be deposited on the deposition surface 501, so as to form on such a deposition surface 501 the zero degree layer.

The apparatus 100 comprises, upstream of the arm 105 with respect to the feeding direction A of the continuous elongated reinforcing element 200, a conventional cutting member 106 (for example of the type illustrated and described in WO 2007/054984 to the same Applicant).

In accordance with the present invention, the arm 105 comprises a plate 110 pivoted to the base 101 at the aforementioned pivoting axis F, so as to be moveable between a rest position in which the arm 105 is in a moved-away position from the forming support 500 and an operative position in which the arm 105 is in a moved-close position to the forming support 500 (as illustrated by the arrow O in FIG. 1).

The movement of the arm 105 around the pivoting axis F is driven by a suitable pneumatic actuator 115 operatively associated with the plate 110 and with the base 101 (as illustrated by the arrow T in FIG. 1). Such a pneumatic actuator 115, of the per se conventional type, allows the force with which the arm 105 is pushed towards the forming support 500 to be adjusted.

A pressing roller 120 is rotatably associated with the plate 110 at a rotation axis R defined in an end portion of the plate 110 distal from the base 101. Therefore, the movement of the plate 110 of the arm 105 around the pivoting axis F causes a corresponding movement of the pressing roller 120 towards/away from the forming support 500.

In accordance with the present invention, an element adapted to generate a magnetic force, for example an element 121 made from magnetic material, like for example Neodymium (Nd Fe B), is associated on the radially outer surface of the pressing roller 120.

Such an element 121 can be made in the form of a coating band or, alternatively, defined by a plurality of elements adapted to be associated at suitable seats specifically provided on the radially outer surface of the pressing roller 120.

Alternatively, the element 121 can be a magnet arranged inside or alongside the pressing roller 120. In this case, the aforementioned magnet is kept in a fixed position with respect to the pressing roller 120, i.e. it does not rotate integrally with the pressing roller 120.

Alternatively, said element 121 can comprise at least one electromagnet.

An inlet roller 130 is rotatably associated with the plate 110 at the pivoting axis F. Such a roller 130 supports the continuous elongated reinforcing element 200, during its movement by the devices provided upstream of the arm 105 towards the forming support 500, at an area defined in an end portion of the plate 110 proximal to the base 101.

In a version of the apparatus 100 that is not illustrated, there are two inlet rollers, arranged one above the other with axes parallel to one another so as to guide the continuous elongated reinforcing element 200 at the lower and upper surfaces thereof.

The arm 105 comprises, between the inlet roller 130 and the pressing roller 120, a guide channel 140 inside which the continuous elongated reinforcing element 200 is intended to run.

Figure 7:
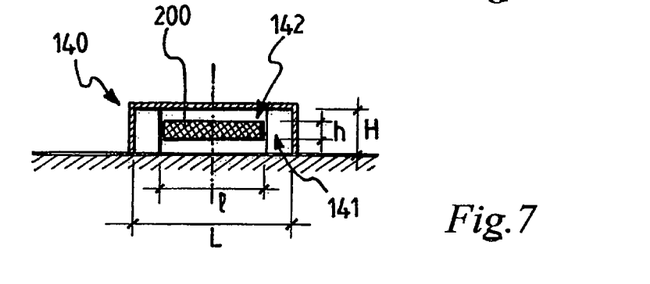
FIG. 7 is a section view taken along the lines I-I of FIGS. 5 and 6.

As illustrated in FIG. 1 and in greater detail in FIG. 7, the guide channel 140 has a closed cross section, with height greater H than the height h of the continuous elongated reinforcing element 200 and width L greater than the width l of the continuous elongated reinforcing element 200. This is in order to avoid as much as possible accidental contacts of the continuous elongated reinforcing element 200 with the upper and side walls of the guide channel 140, so as not to generate undesired friction or stretching on the continuous elongated reinforcing element 200 running in the guide channel 140.

Figure 5:
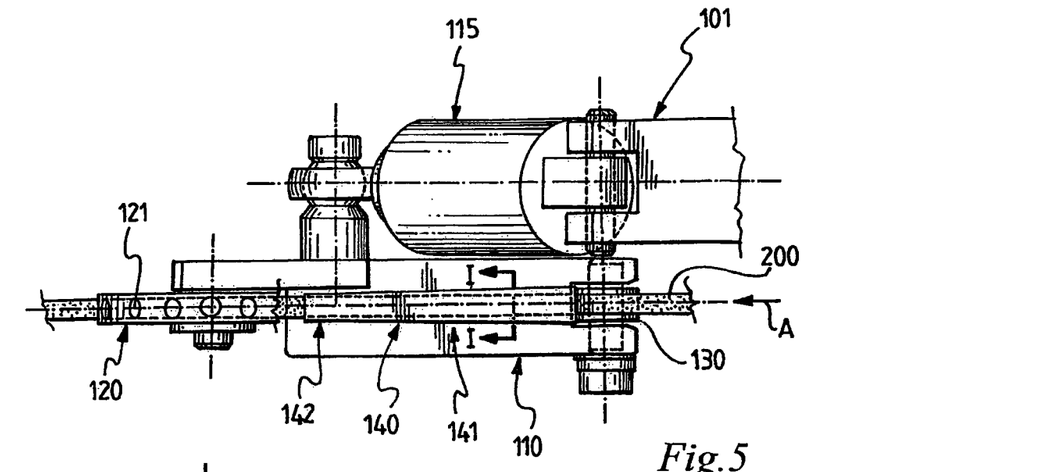
FIG. 5 is a schematic view from above of the apparatus of FIG. 1.

As illustrated in FIG. 1 and in greater detail in FIGS. 5 and 7, the guide channel 140 comprises an upstream portion 141 with progressively decreasing cross sections along the feeding direction of the continuous elongated reinforcing element 200 and a downstream portion 142 with a substantially constant cross section. The upstream portion 141 is longer than the downstream portion, preferably at least 2 times longer than the downstream portion.

In a specific embodiment developed by the Applicant, the height H of the guide channel 140 is roughly twice the height h of the continuous elongated reinforcing element 200. In a preferred solution, at the downstream portion 142 having a substantially constant cross section, H is equal to about 3.5 mm and h is equal to about 1.8 mm, whereas the width L of the guide channel 140 is equal to about 7.6 mm and the width l of the continuous elongated reinforcing element 200 is equal to about 6.3 mm.

Figure 6:
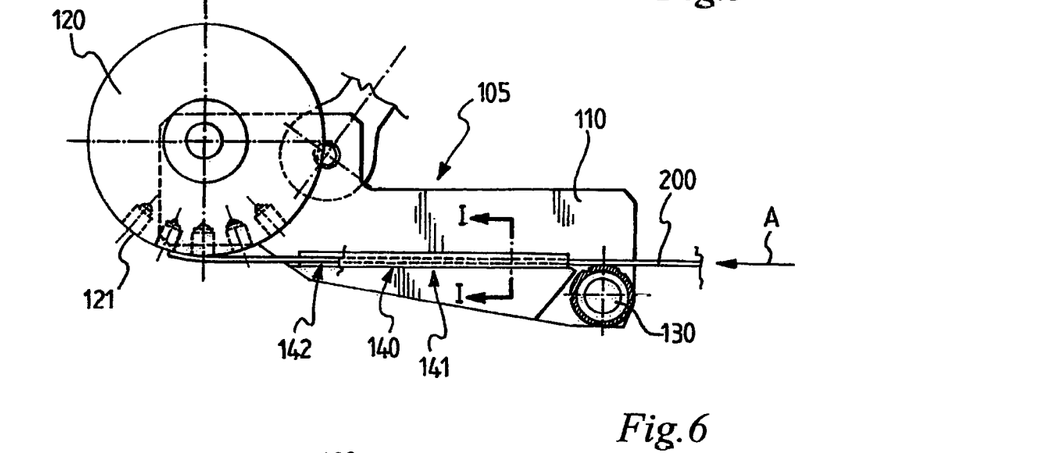
FIG. 6 is a schematic side view of a portion of the apparatus of FIG. 1.

As illustrated in FIG. 6, the mutual arrangement between pressing roller 120, inlet roller 130 and guide channel 140 is studied so that the continuous elongated reinforcing element 200 runs through the guide channel 140 keeping a condition of tangency with the inlet roller 130 and the pressing roller 120, without sliding on the base surface of the guide channel 140.

Such a provision, in combination with suitable sizing of the height and of the width of the guide channel 140 according to the height and width of the continuous elongated reinforcing element 200 (in accordance with what has been described above), allows the continuous elongated reinforcing element 200 to substantially run without sliding in the guide channel 140.

Figure 2A:
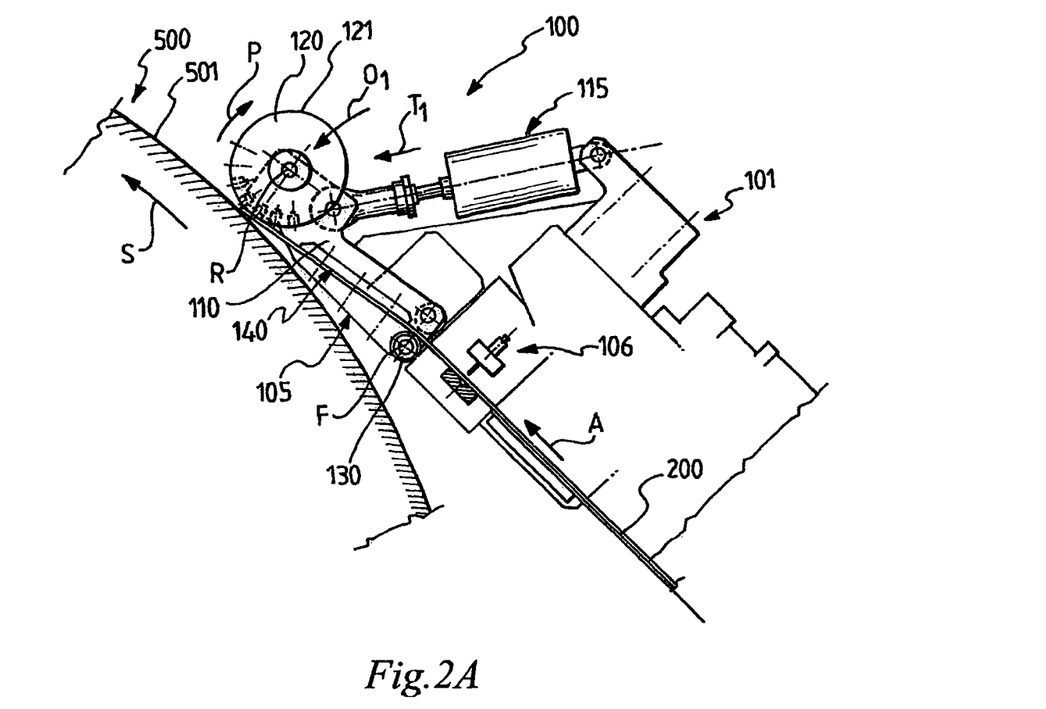
FIG. 2A is a schematic side view of the apparatus of FIG. 1 in a first operative step of the process of the present invention.
Figure 3A:
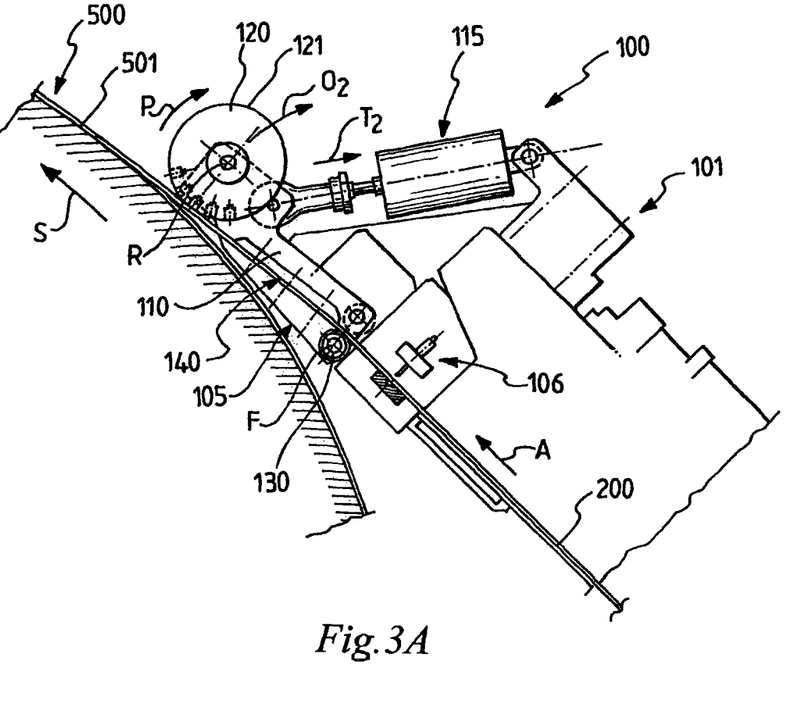
FIG. 3A is a schematic side view of the apparatus of FIG. 1 in a second operative step of the process of the present invention.

The mutual arrangement between base 101 of the apparatus 100 of the present invention and forming support 500 is also studied so that when the arm 105 is in a moved-close position to the forming support 500 the guide channel 140 extends along a direction which is not tangent to the deposition surface 501 (FIGS. 2A and 4A), whereas when the arm 105 is in a moved-away position from the forming support 500 the guide channel 140 extends along a direction substantially tangent to the deposition surface 501 (FIG. 3A).

The deposition process carried out through the apparatus 100 is described below with reference to FIGS. 2A-2B, 3A-3B and 4A-4B.

In a first step of the process, the continuous elongated reinforcing element 200 is fed towards the arm 105 along a feeding direction A. In such a step the cutting member 106 is deactivated.

As illustrated in FIG. 2A, once the arm 105 has been reached, the continuous elongated reinforcing element 200 is guided by the inlet wheel 130 inside the guide channel 140 and through this towards the forming support 500. The portion of continuous elongated reinforcing element 200 that projects canti-levered out of the guide channel 140 is attracted by the pressing roller 120 through the magnetic interaction between the element 121 made from magnetic material associated with the pressing roller 120 and the metallic elements provided inside the continuous elongated reinforcing element 200. The position of the portion of continuous elongated reinforcing element 200 projecting canti-levered from the deposition apparatus 100 is thus "frozen", in this way allowing the continuous elongated reinforcing element 200 to be kept in the desired position with respect to the forming support 500. In such a step, the continuous elongated reinforcing element 200 is in a tangent condition with respect to both the inlet roller 130 and the pressing roller 120 and runs without sliding in the guide channel 140.

While carrying out the aforementioned step, the arm 105 is pushed by the pneumatic actuator 115 into a moved-close position to the deposition surface 501 (as illustrated by the arrows P1 and T1 in FIG. 2A) and the forming support 500 is made to rotate around the rotation axis X (for example in the anti-clockwise direction, as indicated by the arrow S in the attached figures).

The continuous elongated reinforcing element 200 is then pressed by the pressing roller 120 against the deposition surface 501 and the pressing roller 120 is pulled into rotation by friction (as indicated by the arrow P in the attached figures).

Figure 2B:
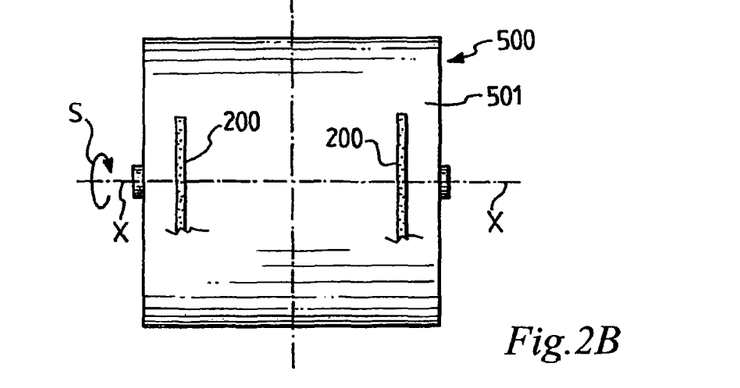
FIG. 2B is a schematic view indicative of the aforementioned first operative step.

In this way the deposition of the continuous elongated reinforcing element 200 on the deposition surface 501 begins, as schematically shown in FIG. 2B. Such deposition takes place according to a direction which is not tangent to the deposition surface 501 of the forming support 500.

Figure 3B:
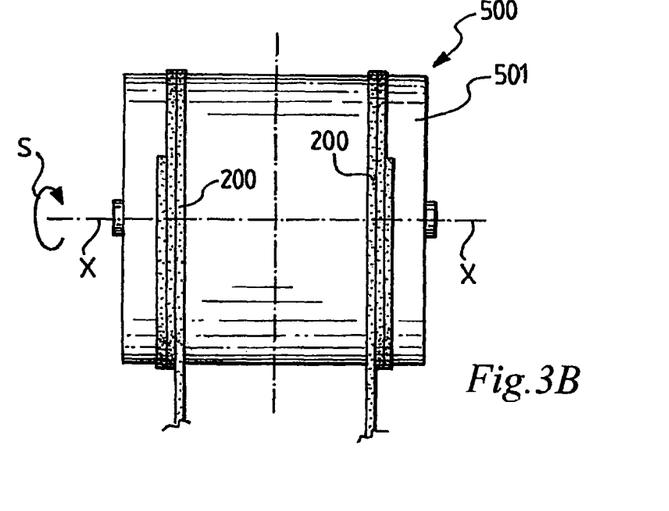
FIG. 3B is a schematic view indicative of the aforementioned second operative step.

In a subsequent step of the process of the present invention, illustrated in FIG. 3A and corresponding to the intermediate step of the deposition of the continuous elongated reinforcing element 200 on the deposition surface 501, the arm 105 is moved away from the deposition surface 501 as indicated by the arrows O2 and T2 in FIG. 3A. In this step, the deposition of the continuous elongated reinforcing element 200 on the deposition surface 501 takes place according to a direction tangent to the deposition surface 501. The continuous elongated reinforcing element 200 is deposited according to adjacent coils perpendicular to the rotation axis X-X of the forming support 500, as illustrated in FIG. 3B.

Figure 4A:
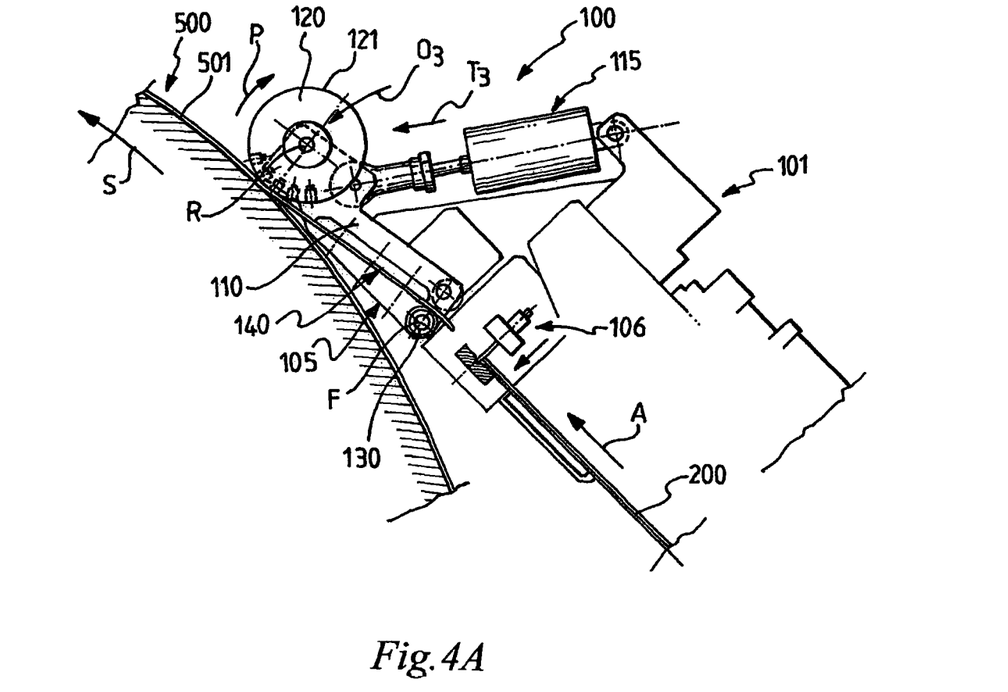
FIG. 4A is a schematic side view of the apparatus of FIG. 1 in a third operative step of the process of the present invention.
Figure 4B:
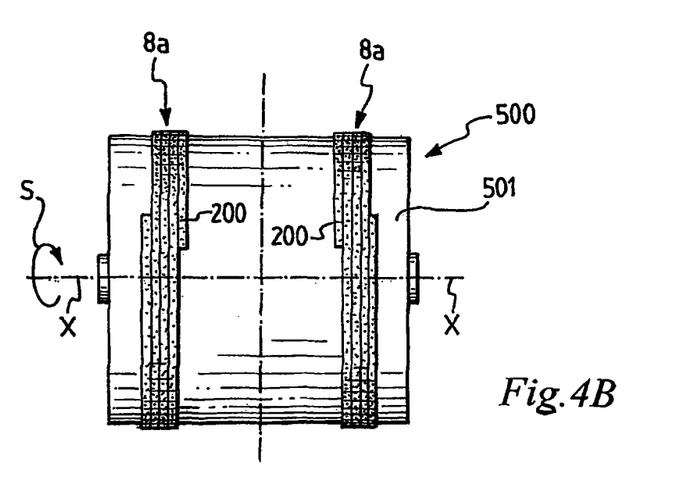
FIG. 4B is a schematic view indicative of the aforementioned third operative step.

In a subsequent step, illustrated in FIG. 4A, the cutting member 106 is activated so as to shear the continuous elongated reinforcing element 200. After this cutting the deposition of the continuous elongated reinforcing element 200 on the deposition surface 501 is completed. In this step, the arm 105 is once again pushed by the pneumatic actuator 115 into a moved-close position to the deposition surface 501 (as illustrated by the arrows O3 and T3 in FIG. 4A). The deposition takes place according to a direction which is not tangent to the deposition surface 501 of the forming support 500.

From what has been described above, it is clear how the process and the apparatus of the present invention allow the deposition of the continuous elongated reinforcing element 200 on the forming support 500 to be carried out avoiding undesired stretching or friction on the continuous elongated reinforcing element 200 and at the same time counteracting possible twisting or lateral deviation of the continuous elongated reinforcing element 200.

Of course, a man skilled in the art can bring further modifications and variants to the invention described above in order to satisfy specific and contingent application requirements, said variants and modifications being in any case within the scope of protection as defined by the following claims.

The invention claimed is:

1. A process for manufacturing a tyre for vehicle wheels, the tyre comprising a belt structure arranged between a carcass structure and a tread band, wherein the belt structure comprises at least one zero-degree reinforcing structure, comprising:
    building said zero-degree reinforcing structure by depositing a continuous elongated reinforcing element on a deposition surface arranged in a radially outer position with respect to a forming support, the deposition comprising:
    exerting a magnetic attraction on a portion of the continuous elongated reinforcing element via at least one deposition pressing member;
        wherein said deposition pressing member comprises at least one pressing roller;
        and wherein said magnetic attraction is generated through at least one element made from magnetic material arranged on said at least one pressing roller;
    moving said at least one deposition pressing member toward the forming support until the continuous elongated reinforcing element is brought into contact with said deposition surface;
    moving said at least one deposition pressing member away from the forming support; and
    depositing the continuous elongated reinforcing element on the forming support by feeding the continuous elongated reinforcing element while keeping said at least one deposition pressing member in the moved-away position and while exerting the magnetic attraction on the continuous elongated reinforcing element through the at least one element made from magnetic material arranged on said at least one pressing roller of said at least one deposition pressing member.

2. The process according to claim 1, wherein the continuous elongated reinforcing element is guided toward the forming support along a guide channel.

3. The process according to claim 2, wherein the continuous elongated reinforcing element runs along a direction which is substantially tangent to at least one inlet roller arranged upstream of said guide channel and to said at least one pressing roller.

4. The process according to claim 2, further comprising moving the guide channel integrally with said at least one pressing member when moving said at least one pressing member toward the forming support until the continuous elongated reinforcing element is brought into contact with said deposition surface.

5. The process according to claim 1, wherein movement of the deposition pressing member toward the forming support is carried out at a beginning of the deposition of the continuous elongated reinforcing element.

6. The process according to claim 1, wherein depositing the continuous elongated reinforcing element on the forming support while keeping said at least one deposition pressing member in such a moved-away position occurs until a shearing of the continuous elongated reinforcing element is carried out; and wherein the deposition of the continuous elongated reinforcing element further comprises:

after the shearing, moving said at least one deposition pressing member toward the forming support until the continuous elongated reinforcing element is brought into contact with said deposition surface.

7. The process according to claim 1, wherein, when said at least one deposition pressing member is moved toward the forming support, said continuous elongated reinforcing element is fed along a direction which is not tangent to the deposition surface.

8. The process according to claim 1, wherein, when said at least one deposition pressing member is moved away from the forming support, said continuous elongated reinforcing element is fed along a direction which is substantially tangent to the deposition surface.

9. The process according to claim 1, further comprising adjusting pressure for driving the movement of said at least one deposition pressing member toward the forming support.

* * * * *